US012359765B2

(12) United States Patent
Phillips et al.

(10) Patent No.: US 12,359,765 B2
(45) Date of Patent: Jul. 15, 2025

(54) COUPLING FOR INSULATED PIPING

(71) Applicant: AIRBUS OPERATIONS LIMITED, Bristol (GB)

(72) Inventors: Samuel Phillips, Bristol (GB); Anthony Bryant, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 156 days.

(21) Appl. No.: 18/098,355

(22) Filed: Jan. 18, 2023

(65) Prior Publication Data

US 2023/0228363 A1 Jul. 20, 2023

(30) Foreign Application Priority Data

Jan. 19, 2022 (GB) ..................................... 2200666
Sep. 28, 2022 (GB) ..................................... 2214212

(51) Int. Cl.
*F16L 59/18* (2006.01)
*F16L 39/00* (2006.01)
*F16L 59/065* (2006.01)

(52) U.S. Cl.
CPC ........... *F16L 59/184* (2013.01); *F16L 39/005* (2013.01); *F16L 59/065* (2013.01)

(58) Field of Classification Search
CPC ..... F16L 59/184; F16L 59/065; F16L 59/075; F16L 39/005; F16L 37/565; F16L 23/167
See application file for complete search history.

(56) References Cited

U.S. PATENT DOCUMENTS 3,275,345 A * 9/1966 Waldron ................ F16L 39/005
3,371,946 A * 3/1968 Bleyle, Jr. ............. F16L 59/184
4,017,102 A * 4/1977 Henderson ............ F16L 39/005
(Continued)

FOREIGN PATENT DOCUMENTS

CN          201348106        11/2009
CN          102155597        8/2011
(Continued)

OTHER PUBLICATIONS

JP-2010169185-A—Machine Translation—English (Year: 2010).*
(Continued)

*Primary Examiner* — William S. Choi
(74) *Attorney, Agent, or Firm* — Nixon & Vanderhye P.C.

(57) ABSTRACT

A coupling for vacuum-insulated piping is disclosed having first and second parts for forming the coupling; each of the first and second parts comprising an inner portion for fluid communication with an inner part of a vacuum-insulated pipe and an outer portion for fluid communication with an outer, low pressure part of a vacuum-insulated pipe; the inner portions of the first and second parts form an inner region for the passage of fluid therethrough; each of the first and second parts comprising an interface portion for forming an interface with interface portion of the other of the first and second parts, the interface portion comprising a flange for connecting the first and second parts; each of the first and second parts comprises a sleeve surrounding the outer portion, the sleeve comprising a thermally-conducting portion that is in thermal communication with the interface portion so as to conduct heat away from the interface portion.

19 Claims, 10 Drawing Sheets

(56) References Cited

U.S. PATENT DOCUMENTS

| | | | |
|---|---|---|---|
| 4,491,347 A | 1/1985 | Gustafson | |
| 5,628,517 A | 5/1997 | Jia | |
| 8,308,200 B1 | 11/2012 | Barnes et al. | |
| 2004/0055642 A1 | 3/2004 | Valentian | |
| 2009/0261578 A1 | 10/2009 | Lange et al. | |
| 2015/0226368 A1* | 8/2015 | Schellin | F16L 59/184 |
| 2021/0061640 A1 | 3/2021 | Umemura et al. | |
| 2021/0207759 A1 | 7/2021 | Schulz et al. | |
| 2021/0278028 A1 | 9/2021 | Schulz et al. | |
| 2023/0139421 A1 | 5/2023 | Pedoussaut et al. | |

FOREIGN PATENT DOCUMENTS

| | | | |
|---|---|---|---|
| CN | 110107756 | | 8/2019 |
| CN | 213776847 | | 7/2021 |
| DE | 40 05 303 A1 | | 8/1991 |
| EP | 2 957 805 | | 12/2015 |
| EP | 4 174 357 A1 | | 5/2023 |
| FR | 2 574 524 A1 | | 6/1986 |
| FR | 3 119 007 A1 | | 7/2022 |
| GB | 1 567 373 | | 5/1980 |
| GB | 2 166 514 A | | 5/1986 |
| GB | 2 241 035 A | | 8/1991 |
| JP | 2007-332992 A | | 12/2007 |
| JP | 2010169185 A | * | 8/2010 |
| JP | 2016/180467 | | 10/2016 |
| KR | 10-2017-0059269 | | 5/2017 |
| WO | 2007/065492 A1 | | 6/2007 |
| WO | 2016/051770 A1 | | 4/2016 |

OTHER PUBLICATIONS

ACME Cryogenics, Field Joint Connector, <https://www.acmecryo.com/products/vacuum-jacketed-pipe-systems/vacuum-jacketed-piping-application-specific-accessories/field-joint-connector/>, 6 pages.
Vaccuum Insulated Pipe—Dissimilar Metal Bayonet Connections, Description of bayonet coupling available Oct. 2021, according to the Internet Archive <https://web.archive.org/web/20211025181458/https:/files.chartindustries.com/10667491_VIPbayonet.pdf>, obtained Dec. 20, 2022, 2 pages.
Search Report for GB2200666.2, dated Jun. 9, 2022, 2 pages.
European Search Report for Application No. EP23200091.9, four pages, dated Dec. 7, 2023.
Partial European Search Report for Application No. EP 23 15 2068, one page, dated Jul. 27, 2023.

* cited by examiner

COUPLING FOR INSULATED PIPING

CROSS RELATED APPLICATIONS

This application claims priority to United Kingdom Patent Applications GB 2200666.2, filed on Jan. 19, 2022, and GB 2214212.9, filed on Sep. 28, 2022, the entire contents of each of which are hereby incorporated by reference.

BACKGROUND OF THE INVENTION

The present disclosure relates to couplings for insulated piping.

The present invention concerns couplings for coupling insulated piping, optionally vacuum-insulated piping. More particularly, but not exclusively, this invention concerns a coupling for insulated piping, such as vacuum-insulated piping. The invention also concerns a kit for forming a coupling, first and second parts for forming such a coupling, an insulated piping arrangement, a fuel-delivery arrangement, a vehicle comprising an insulated piping arrangement and/or a fuel-delivery arrangement and a method of supplying a chilled liquid fuel.

Rigid couplings in insulated piping, such as vacuum-insulated piping, (also known as 'Vacuum Jacketed' or 'Super Insulated') are typically based on plain bolted flanges with compressible seals, clamped V-flanges with compressible seals, or vacuum insulated 'bayonet' couplings.

Insulated pipes are double-walled pipes that are typically used to carry cold fluids (typically liquids). The cold fluid is carried in a central conduit. An outer annular region surrounds the central conduit, and provides thermal insulation for the central conduit. A solid insulative material may be provided in the outer annular region. In a vacuum-insulated pipe, the outer annular region is at a low pressure. In certain cases, air is removed from the pipe to provide the low-pressure region during pipe manufacture. In other cases, air may be continuously removed from the pipe using a vacuum pump to provide the low-pressure region. Sections of pipe are typically connected together using a two-part pipe coupling, which may comprise plain bolted flanges with compressible seals, clamped V-flanges with compressible seals, or vacuum insulated 'bayonet' couplings.

Such couplings typically comprise metal and therefore provide a potential point of thermal ingress to the cold fluid carried in the central conduit. Heating of the cold fluid is undesirable. Furthermore, such couplings connect two sections of pipe and it is therefore desirable for the couplings to be strong, and to resist unwanted deformation of the pipe.

Bayonet couplings are less susceptible to thermal ingress problems compared to flanged couplings, but are heavy and expensive. Furthermore, such bayonet couplings need to be handled and installed carefully. Bayonet couplings are also typically relatively long, and therefore may not be suitable for providing joins in pipes with bends or junctions (such as T-junctions).

The present invention seeks to mitigate one or more of the above-mentioned problems. Alternatively or additionally, the present invention seeks to provide an improved coupling for insulated piping.

SUMMARY OF THE INVENTION

A first aspect of the present invention provides a coupling for insulated piping, the coupling comprising:
first and second parts for forming the coupling;
each of the first and second parts comprising an inner portion for fluid communication with an inner part of an insulated pipe and an outer portion for communication with an outer, insulative part of an insulated pipe;
the inner portions of the first and second parts being suitable for forming an inner region for the passage of fluid therethrough;
each of the first and second parts comprising an interface portion for forming an interface with an interface portion of the other of the first and second parts, the interface portion comprising a flange for connecting the first and second parts, and an interface second portion located inwards of the flange;
at least one of the first and second parts comprises a thermally-conductive portion that extends away from the interface portion and which provides a thermally-conductive path between the flange and the interface second portion.

The applicant has discovered that it is beneficial to provide a coupling with a long thermally-conductive path between the flange which is subject to ambient environmental conditions and the interface second portion.

Optionally, the interface portion extends radially outwards from the interface second portion to the flange.

Optionally, at least one (and preferably each) of the first and second parts comprises a thermally-insulative portion between the flange and the interface second portion, thereby providing a thermally-insulative path in a radial direction between the flange and the interface second portion.

Optionally, both the first and second parts comprise a thermally-conductive portion that extends away from the respective interface portion and which provides a thermally-conductive path between the respective flange and the respective interface second portion.

The coupling is optionally a coupling for vacuum-insulated piping. Each of the first and second parts optionally comprises an inner portion for fluid communication with an inner part of a vacuum-insulated pipe and an outer portion for fluid communication with an outer, low-pressure part of a vacuum-insulated pipe.

The interface second portion may be proximate to, and optionally outward of, the inner portion for fluid communication with an inner part of an insulated pipe. The interface second portion may comprise a portion of reduced conductive cross-section. The portion of reduced conductive cross-section reduces thermal conduction between the flange and the fluid carried by the coupling. The interface second portion may comprise a wall, optionally an annular wall. The portion of reduced conductive cross-section may comprise one or more recesses or apertures in the interface second portion. One or more of the recesses or apertures may be provided with a solid, thermally-insulative material. Such thermally-insulative material may provide strength and/or rigidity to the coupling.

The thermally-conductive portion may comprise a first thermally-conductive portion and a second thermally-conductive portion, the first thermally-conductive portion being inward of the second thermally-conductive portion. The first and second thermally-conductive portions may form a sleeve.

The thermally-conductive portion may extend away from the flange to a region remote from the flange and may extend from the region remote from the flange to the interface second portion. Such an arrangement may provide a long thermal path from the flange to the interface second portion.

A length of the thermally-conductive portion (and optionally the sleeve, if present) may be at least 60 mm, optionally at least 80 mm, optionally at least 100 mm, and optionally at least 120 mm. A length of the thermally-conductive portion (and optionally the sleeve, if present) may be no more than 300 mm, optionally no more than 250 mm, optionally no more than 200 mm, optionally no more than 180 mm, optionally no more than 160 mm, optionally no more than 140 mm and optionally no more than 120 mm. A length of the thermally-conductive portion (and optionally the sleeve, if present) may be from 60 to 300 mm, optionally from 80 to 250 mm, and optionally from 100 to 200 mm. Such lengths have proven to be effective in conducting heat away from the interface portion of the first or second part, when the external diameter of the vacuum pipe is 3.5" (~89 mm).

As mentioned above, the thermally-conductive portion may extend away from the flange to a region remote from the flange and may extend from the region remote from the flange to the interface second portion. The region remote from the flange may be at least 60 mm, optionally at least 80 mm, optionally at least 100 mm, and optionally at least 120 mm from the flange. The region remote from the flange may be no more than 300 mm, optionally no more than 250 mm, optionally no more than 200 mm, optionally no more than 180 mm, optionally no more than 160 mm, optionally no more than 140 mm and optionally no more than 120 mm from the flange. The region remote from the flange may be from 60 to 300 mm, optionally from 80 to 250 mm, and optionally from 100 to 200 mm from the flange.

The thermally-conductive portion (and optionally the sleeve, if present) projects from the respective flange. A length of the thermally-conductive portion (and optionally the sleeve, if present) may be determined as being the distance that the thermally-conductive portion (and optionally the sleeve, if present) projects from the respective flange.

A length of the thermally-conductive portion (and optionally the sleeve, if present) may be at least 60% of the external dimension of the sleeve (if present), optionally at least 80%, optionally at least 100% and optionally at least 120% of the external dimension of the sleeve.

A length of the thermally-conductive portion (and optionally the sleeve, if present) may be no more than 400% of the external dimension of the sleeve (if present), optionally no more than 350%, optionally no more than 300%, optionally no more than 250%, optionally no more than 200%, optionally no more than 150% and optionally no more than 100% of the external dimension of the sleeve. A length of the thermally-conductive portion (and optionally the sleeve, if present) may be from 60% to 300% of the external dimension of the sleeve (if present), optionally from 80% to 300% and optionally from 100% to 150% of the external dimension of the sleeve. Such lengths have proven to be effective in conducting heat away from the interface portion of the first or second part. The external dimension of the sleeve is optionally an external diameter of the sleeve because the sleeve may be right circular cylindrical.

The inner portion may be for interfacing with an inner part of an insulated pipe, such as a vacuum-insulated pipe. The outer portion may be for interfacing with an outer part of an insulated pipe. At least one, and optionally each of the first and second parts may comprise an inner conduit portion for interfacing with an inner tube of an insulated pipe. The inner conduit portion may be configured to receive, or be received by, an inner tube of an insulated pipe.

The inner conduit portion of the first part optionally comprises a projection, and the second part optionally comprises a projection-receiving portion for receiving the projection of the first part. The projection may comprise a lower thermal expansion region having a first co-efficient of thermal expansion. The projection-receiving portion may have a second co-efficient of thermal expansion, the second co-efficient of thermal expansion being greater than the first co-efficient of thermal expansion. The phrase "lower thermal expansion region" is used to facilitate identification of said region and to state that the thermal expansion co-efficient of said region is lower than that of the projection-receiving portion.

The applicant has discovered that it is possible to form a coupling with enhanced engagement when cold liquid, such as liquid hydrogen, is passed through the inner conduit portions.

The projection and projection-receiving portion are configured so that the projection-receiving portion engages the projection when cooled to temperatures associated with the passage of cold liquid through the inner conduit portions. Such temperatures will optionally be no more than 0° C., optionally no more than −50° C., optionally no more than −100° C., optionally no more than −150° C., optionally no more than −200° C., optionally no more than −250° C., and optionally no more than −260° C., and optionally, and optionally no less than −100° C., optionally no less than −150° C., optionally no less than −200° C. and optionally no less than −260° C. For example, the projection and projection-receiving portion are configured so that the projection-receiving portion engages the projection when cooled to temperatures associated with the passage of liquid nitrogen, liquid oxygen or liquid hydrogen through the inner conduit portions.

The projection-receiving portion may comprise steel. The coefficient of thermal expansion of the projection-receiving portion may be at least $5\times10^{-6}K^{-1}$, optionally at least $8\times10^{-6}K^{-1}$, and optionally at least $1\times10^{-5}K^{-1}$.

The lower thermal expansion region of the projection may be formed from a low thermal expansion material, such as Invar or a suitable polymer. The lower thermal expansion region may have a coefficient of thermal expansion of no more than $2\times10^{-6}K^{-1}$, optionally of no more than $1.5\times10^{-6}K^{-1}$, and optionally no more than $1.0\times10^{-6}K^{-1}$.

The projection may optionally be proximate to the flange of the first part. The projection may be proximate to the interface region of the first part. The projection may project from the interface region of the first part.

The projection-receiving portion may be proximate to the flange of the second part. The projection-receiving portion optionally extends from the interface region of the second part, optionally rearwardly, if the direction the interface region faces defines a forwards direction.

The inner conduit portion of the second part may comprise the projection-receiving portion. The inner conduit portion of the second part may comprise a non-receiving portion that does not receive the projection. The projection-receiving portion may be cylindrical. The cross-sectional area, diameter and/or shape of the projection-receiving portion may be the same, or different from, that of the non-receiving portion. For example, the diameter of the projection-receiving portion may be greater than that of the non-projection receiving portion. This may be the case, for example, if the diameter of the projection is the same as the non-receiving portion, and/or if the diameter of the projection is the same as that of the non-projecting portion of the inner conduit portion of the first part.

The cross-sectional area, diameter and/or shape of the projection may be the same as, or different from, that of the non-projection portion of the inner conduit portion of the first part. For example, the diameter of the projection may be the same as that of the non-projection portion of the inner conduit portion of the first part. For example, the diameter of the projection may be different from that of the non-projection portion of the inner conduit portion of the first part.

As mentioned above, the inner conduit portion of the first part optionally comprises a projection comprising a lower thermal expansion region having a first co-efficient of thermal expansion. The lower thermal expansion region may provide an end or tip portion of the projection. In this case, the projection may comprise a base portion, in which case the base portion may comprise a material different from the end or tip portion, said material having a thermal co-efficient of thermal expansion that is greater than the lower thermal expansion region. The lower thermal expansion region may comprise substantially the entire projection. The tip portion may optionally have a length of at least 2 mm, optionally at least 5 mm, optionally at least 10 mm and optionally at least 20 mm. The tip portion may have a length of no more than 100 mm, optionally no more than 80 mm, optionally no more than 60 mm, optionally no more than 50 mm, optionally no more than 40 mm, optionally no more than 30 mm, optionally no more than 20 mm and optionally no more than 10 mm.

Optionally, the projection optionally has a length of at least 2 mm, optionally at least 5 mm, optionally at least 10 mm and optionally at least 20 mm. The projection may optionally have a length of no more than 100 mm, optionally no more than 80 mm, optionally no more than 60 mm, optionally no more than 50 mm, optionally no more than 40 mm, optionally no more than 30 mm, optionally no more than 20 mm and optionally no more than 10 mm.

The length of the projection-receiving portion is commensurately sized to accommodate the projection.

Alternatively, the inner conduit portion may be configured to abut an inner tube of an insulated pipe. The inner conduit portion may extend from the interface portion of the respective first or second part. In use, fluid flows through the inner conduit portion. The inner conduit portion optionally extends orthogonal to the flange. The inner conduit portion optionally extends parallel to the sleeve. Optionally, the inner conduit portion extends past the thermally-conductive portion (and optionally the sleeve, if present). Such an arrangement may facilitate attachment of the inner conduit portion to an inner tube of an insulated pipe. The inner conduit portion and the thermally-conductive portion (and optionally the sleeve, if present) optionally defines a space for interfacing with an insulative region of an insulated pipe. The space may be annular is cross-section. The thermally-conductive portion (and optionally the sleeve, if present) may be configured to receive an outer tube of an insulated pipe. The thermally-conductive portion (and optionally the sleeve, if present) may be configured to abut an outer tube of an insulated pipe.

The first and/or second part (and optionally the sleeve, if present) may comprise a thermally-insulative portion, as described above. The thermally-insulative portion may be outwards of the outer portion. The applicant has discovered that it is beneficial to provide a thermally-insulative portion to inhibit unwanted transfer of heat from the ambient environment to a liquid carried in an inner part of an insulated pipe.

The thermally-insulative portion may cylindrical in shape.

As mentioned above, the thermally-conductive portion may provide a thermally-conductive path between the flange and the interface second portion. In this connection, the thermally-conductive portion may comprise a first thermally-conductive portion and a second thermally-conductive portion, the first thermally-conductive portion being inward of the second thermally-conductive portion, the first thermally-conductive portion being in thermal communication with the second thermally-conductive portion. A thermally-conductive path is therefore provided between the flange and the interface second portion by the first thermally-conductive portion and the second thermally-conductive portion. The thermally-insulative portion may be located between the first thermally-conductive portion and the second thermally-conductive portion. One or both of the first and second thermally-conductive portions may be substantially cylindrical in shape. One or both of the first and second thermally-conductive portions may be in contact with the thermally-insulative portion.

The thermally-conductive portion may extend away from the flange to a region remote from the flange and may extend from the region remote from the flange to the interface second portion. Such an arrangement may provide a long thermal path from the flange to the interface second portion.

One or both of the first and second thermally-conductive portions may have a mean thickness of at least 0.5 mm, optionally at least 1.0 mm, optionally at least 1.5 mm and optionally at least 2.0 mm.

One or both of the first and second thermally-conductive portions may have a mean thickness of no more than 5.0 mm, optionally no more than 4.0 mm, optionally no more than 3.0 mm, optionally no more than 2.5 mm, optionally no more than 2.0 mm and optionally no more than 1.5 mm.

The thermally-conductive portion may comprise a thermally-conductive end portion. The thermally-conductive end portion may be located in the thermal path between the first thermally-conductive portion and the second thermally-conductive portion. The thermally-conductive end portion may optionally have a mean thickness of at least 1 mm, optionally at least 2 mm, optionally at least 3 mm, optionally at least 4 mm, optionally at least 5 mm, and optionally at least 8 mm.

The thermally-insulative portion may optionally have a mean thickness of at least 1 mm, optionally at least 2 mm, optionally at least 3 mm, optionally at least 4 mm, and optionally at least 5 mm.

The thermally-insulative portion may optionally have a mean thickness of no more than 30 mm, optionally no more than 25 mm, optionally no more than 20 mm, optionally no more than 15 mm, and optionally no more than 10 mm.

The thermally-insulative portion may optionally have a mean thickness of from 1 to 30 mm, optionally of from 2 to 25 mm, optionally of from 5 to 20 mm, and optionally of from 8 to 20 mm.

The thermally-conductive portion optionally has a thermal conductivity of at least 10 W/m·K, optionally at least 12 W/m·K, optionally at least 14 W/m·K and optionally at least 16 W/m·K. For the avoidance of doubt, thermal conductivities may be determined at 20° C.

The thermally-insulative portion is optionally solid. The thermally-insulative-portion is optionally rigid. It is preferred that the thermally-insulative portion provides some structural support to the coupling.

The thermally-insulative portion optionally comprises plastics material. The thermally-insulative portion optionally comprises amorphous material, such as amorphous plastics material. For example, the thermally-insulative material may optionally comprise a polymer, such as a polyetherimide (such as ULTEM®). The applicant has discovered that amorphous plastics materials may provide both a sufficiently low thermal conductivity and a sufficiently high Young's modulus.

The thermally-insulative portion optionally has a thermal conductivity of no more than 1 W/m·K, optionally of no more than 0.8 W/m·K, optionally of no more than 0.6 W/m·K, optionally of no more than 0.4 W/m·K and optionally of no more than 0.3 W/m·K.

The thermally-insulative portion optionally has a Young's modulus of at least 0.5 GPa, optionally at least 1.0 GPa, optionally at least 1.5 GPa, optionally at least 2.0 GPa and optionally at least 2.5 GPa. For the avoidance of doubt, the Young's modulus may be determined at ambient temperature (typically from 15 to 25° C.).

The thermally-insulative portion may be incorporated into the coupling in any suitable way. For example, a pre-formed solid thermally-insulative portion may be adhered or otherwise attached to the first or second part of the coupling. Alternatively, a solid thermally-insulative material may be heated to a flowable form, introduced into the first or second part of the coupling and cooled, thereby forming the thermally-insulative portion.

As previously mentioned, the thermally-conductive portion (and optionally the sleeve, if present) optionally has a length. The length is optionally measured along a longitudinal axis of the thermally-conductive portion (and optionally the sleeve, if present). Optionally, the thermally-insulative portion extends along at least 50% of the length of the thermally-conductive portion (and optionally the sleeve, if present), optionally along at least 60%, optionally along at least 70%, optionally at least 80%, optionally at least 90% and optionally at least 95% of the length of the thermally-conductive portion (and optionally the sleeve, if present).

The coupling optionally comprises a first seal-forming member. An interface portion may be provided with the first seal-forming member. One of the first and second parts is optionally provided with the first seal-forming member. The first seal-forming member may be annular in shape. The first seal-forming member may be located outward of the inner portion. If the respective first or second part comprises an inner conduit portion, then the first seal-forming member may be located outwards of the inner conduit portion. The first seal-forming member may be located inward of the outer portion. The first seal-forming member may be located inward of the thermally-conductive portion (and optionally the sleeve, if present). In use, the first seal-forming member is located outward of the inner portion of an insulated pipe, inhibiting egress of liquid carried in the inner portion of an insulated pipe.

The coupling optionally comprises a second seal-forming member. One of the first and second parts is provided with the second seal-forming member. Optionally, one of the first and second parts is provided with both the first and second seal-forming members. The second seal-forming member may optionally be located outwards of the thermally-conductive portion (and optionally the sleeve, if present).

The flange(s) may be provided with a plurality of apertures for the receipt of fasteners, such as bolts. The plurality of apertures may be spaced around said flange, optionally substantially evenly around said flange. The flange may extend laterally from the respective first or second part. The flange may extend substantially orthogonal to a longitudinal axis of the respective first or second part.

The coupling may be provided with thermal insulation around at least part of the first and second parts of the coupling. Thermal insulation may be provided around substantially both of the first and second parts of the coupling.

The first and second parts may be provided with apertures or passages that together provide one or more flow paths between the outer regions of the first and second parts. This facilitates the removal of gas from the outer regions of the first and second parts using a single vacuum pump or other means for reducing pressure, if the coupling is for use with vacuum-insulated piping.

The interface portions of the first and second parts may comprise a substantially flat face portion. The substantially flat face portions may be urged together in the coupling.

In accordance with a second aspect of the present invention, there is provided a coupling for insulated piping, the coupling comprising:

first and second parts for forming the coupling, each of the first and second parts comprising an inner portion for fluid communication with an inner part of an insulated pipe, and an outer portion for fluid communication with an outer, insulative part of an insulated pipe the inner portions of the first and second parts being suitable for forming an inner region for the passage of fluid therethrough, at least one of the first and second parts comprises a sleeve surrounding the outer portion, the sleeve comprising a thermally-insulative portion surrounding the outer portion.

The applicant has discovered that it is beneficial to provide a sleeve comprising a thermally-insulative portion to inhibit unwanted transfer of heat from the ambient environment to a liquid carried in an inner part of an insulated pipe.

The coupling may comprise any feature described above in relation to the first aspect of the present invention. For example, the thermally-insulative portion may comprise one or more of the features described above in relation to the coupling of the first aspect of the present invention.

The sleeve may comprise a thermally-conductive portion that extends away from the interface portion, which thermally-conductive portion is in thermal communication with the interface portion so as to conduct heat away from the interface portion. The thermally-conductive portion may comprise one or more of the features described above in relation to the coupling of the first aspect of the present invention.

At least one or both of the first and second parts may comprise a flange and an interface second portion inward of the flange. The flange may have those features described above in relation to the first aspect of the present invention. At least one or both of the first and second parts may comprise a thermally-conductive portion that provides a thermally-conductive path between the interface second portion and the flange. The thermally-conductive portion may extend away from the interface portion. In this connection, the thermally-conductive portion may comprise a first thermally-conductive portion and a second thermally-conductive portion, the first thermally-conductive portion being inward of the second thermally-conductive portion, wherein the first thermally-conductive portion is in thermal communication with the second thermally-conductive portion. The thermally-insulative portion may be located between the flange and the second interface portion, thereby providing a thermally-insulative path in a radial direction between the flange and the interface second portion. The thermally-insulative portion may be located between the first and second thermally-conductive portions.

The coupling is optionally a coupling for vacuum-insulated piping. Each of the first and second parts optionally comprises an inner portion for fluid communication with an inner part of a vacuum-insulated pipe and an outer portion for fluid communication with an outer, low-pressure part of a vacuum-insulated pipe.

In accordance with a third aspect of the present invention, there is provided a coupling for insulated piping, the coupling comprising:

first and second parts for forming the coupling;

each of the first and second parts comprising an inner portion for fluid communication with an inner part of an insulated pipe and an outer portion for fluid communication with an outer, insulative part of an insulated pipe;

the inner portions of the first and second parts being suitable for forming an inner region for the passage of fluid therethrough;

each of the first and second parts comprising an interface portion for forming an interface with an interface portion of the other of the first and second parts, the interface portion comprising a flange for connecting the first and second parts, at least one of the first and second parts comprising a thermally-conductive portion that extends away from the interface portion.

The applicant has discovered that the thermal properties of the coupling may be enhanced by providing a thermally-conductive portion that extends from the interface portion. The thermally-conductive portion may extend from the flange, for example. The thermally-conductive portion may form part of a sleeve. The sleeve may comprise a thermally-insulative portion. At least a part of the thermally-insulative portion may be located outward of the thermally-insulative portion. For example, the thermally-conductive portion may comprise an outer wall that is located outward of the thermally-insulative portion. Additionally, the thermally-conductive portion may comprise an inner wall that is located inward of the thermally-insulative portion. The sleeve may comprise those features described above in relation to the first and second aspects of the present invention. The first and/or second part of the coupling may comprise an interface second portion inward of the flange. The thermally-conductive portion may provide a thermally-conductive path between the flange and the interface second portion.

The interface portion may extend radially outwards from the interface second portion to the flange. At least one (and optionally each) of the first and second parts comprises a thermally-insulative portion between the flange and the interface second portion, thereby providing a thermally-insulative path in a radial direction between the flange and the interface second portion.

The thermally-conductive portion may extend away from the flange to a region remote from the flange and may extend from the region remote from the flange to the interface second portion. Such an arrangement may provide a long thermal path from the flange to the interface second portion.

The coupling of the third aspect of the present invention may comprise any of the features of the coupling of the first and second aspects of the present invention. Likewise, the couplings of the first and second aspects of the present invention may comprise any of the features of the third aspect of the present invention.

In accordance with a fourth aspect of the present invention, there is provided a coupling for vacuum-insulated piping, the coupling comprising:

first and second parts for forming the coupling;

each of the first and second parts comprising:

an interface portion comprising a substantially flat face, and a flange for connecting the first and second parts, the flat faces of the first and second parts facing each other;

a first, inner conduit extending away from the substantially flat face and the flange, the first, inner conduit being configured to interface with an inner tube of a vacuum-insulated pipe;

a second, outer conduit that is substantially concentric with the first, inner conduit, the second, outer conduit extending away from the substantially flat face and the flange, the second, outer conduit being configured to interface with an outer tube of a vacuum-insulated pipe, wherein the second, outer conduit comprises (a) a cylindrical thermally-conducting portion that is in thermal communication with the interface portion so as to conduct heat away from the interface portion, and (b) a cylindrical thermally-insulative portion for inhibiting transfer of heat to the first, inner conduit.

Those skilled in the art will realise that the coupling of the fourth aspect of the present invention may comprise those features described above in relation to the couplings of the first and second aspects of the present invention.

In accordance with a fifth aspect of the present invention, there is provided a first and/or second part of a coupling for use in the couplings of the first, second, third and/or fourth aspects of the present invention.

In accordance with a sixth aspect of the present invention, there is provided a kit for forming a coupling in accordance with the first, second, third and/or fourth aspects of the present invention, the kit comprising a first part and a second part of a coupling in accordance with the first, second, third and/or fourth aspect of the present invention.

The first and second parts of the coupling may comprise those features described above in relation to the couplings of the first, second, third and/or fourth aspects of the present invention.

In accordance with a seventh aspect of the present invention, there is provided an insulated pipe comprising a first and/or a second part of a coupling in accordance with the fifth aspect of the present invention.

The insulated pipe may be a vacuum-insulated pipe. The insulated pipe optionally comprises an inner pipe for the carriage of a fluid, optionally a cold fluid, and an outer pipe in which there is reduced pressure. Optionally, the first or second part of the coupling is attached or otherwise connected to the insulated pipe. Alternatively, the first or second part of the coupling may be integral with the insulated pipe. Those skilled in the art will realise that the reduced pressure region in an insulated pipe is not at a true vacuum. The pressure is sufficiently reduced so as to inhibit transfer of heat from the ambient environment to the fluid carried in the inner pipe. The inner pipe may be interfaced (or integral) with the inner portion of the first and/or second part of the coupling. The inner pipe may be in fluid communication with the inner portion of the coupling. If the first and/or second part comprises an inner conduit portion, then the inner pipe of the insulated pipe may be interfaced (or integral) with the inner conduit portion, optionally with the inner portion of the coupling being in fluid communication with the inner pipe, optionally so that there is a fluid flow path between the inner pipe of the insulated pipe and the inner conduit portion. There may be overlap between the inner conduit portion and the inner pipe. Such overlap may permit attachment of the coupling to the insulated pipe. The outer pipe of the insulated pipe may be interfaced (or integral) with the sleeve. There may be overlap between the sleeve and the outer pipe. Such overlap may permit attachment of the coupling to the insulated pipe.

The inner pipe and the outer pipe of the insulated pipe may define a region that is, in use, subject to a low pressure. This low pressure region is optionally in fluid communication with the outer region of the coupling.

The insulated pipe of the seventh aspect of the present invention may comprise more than one first part and/or second part of a coupling in accordance with the fifth aspect of the present invention. For example, a first connecting region of the insulated pipe may comprise a first or second part of a coupling in accordance with the fifth aspect of the present invention, and a second connecting region of the insulated pipe may comprise a first or second part of a coupling in accordance with the fifth aspect of the present invention. A third connecting region of the -insulated pipe may be comprise a first or second part of a coupling in accordance with the fifth aspect of the present invention, for example, if the insulated pipe is in the form of a T-shape.

In accordance with an eighth aspect of the present invention, there is provided an insulated piping arrangement comprising first and second insulated pipes connected by a coupling in accordance with the first, second, third and/or fourth aspects of the present invention. The piping arrangement may be a vacuum-insulated piping arrangement comprising first and second vacuum-insulated pipes.

The insulated piping arrangement of the eighth aspect of the present invention may comprise any of the features described above in relation to the first to seventh aspects of the present invention.

According to a ninth aspect of the present invention, there is provided a kit for forming an insulated pipe in accordance with the seventh aspect of the present invention or an insulated piping arrangement in accordance with the eighth aspect of the present invention, the kit comprising one or more lengths of insulated pipe and at least one first and/or second part of a coupling in accordance with the first, second, third and/or fourth aspects of the present invention. The kit may be for forming a vacuum-insulated pipe, and may comprise one or more lengths of vacuum-insulated pipe.

In accordance with a tenth aspect of the present invention, there is provided a fuel delivery arrangement comprising one or more fuel tanks configured to deliver fuel to an engine or motor through an insulated piping arrangement (optionally a vacuum-insulated piping arrangement) according to the eighth aspect of the present invention. The fuel may be a liquefied gas, such as hydrogen.

In accordance with an eleventh aspect of the present invention, there is provided a vehicle comprising an insulated piping arrangement (optionally a vacuum-insulated piping arrangement) in accordance with the eighth aspect of the present invention and/or a fuel delivery arrangement according to the tenth aspect of the present invention. The vehicle may be land-based vehicle, such as an automobile, van, truck, lorry, bus, motorbike, tram or train. The vehicle may be an aircraft, such as a fixed-wing aircraft or a rotary aircraft.

In accordance with a twelfth aspect of the present invention, there is provided a method of supplying a chilled liquid fuel, the method comprising passing said chilled liquid fuel through a coupling in accordance with the first, second, third or fourth aspects of the present invention, an insulated pipe (optionally a vacuum-insulated pipe) in accordance with the seventh aspect of the present invention, an insulated piping arrangement (optionally a vacuum-insulated piping arrangement) in accordance with the eighth aspect of the present invention or a fuel delivery arrangement of the tenth aspect of the present invention. The chilled liquid fuel may comprise liquid hydrogen.

It will, of course, be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
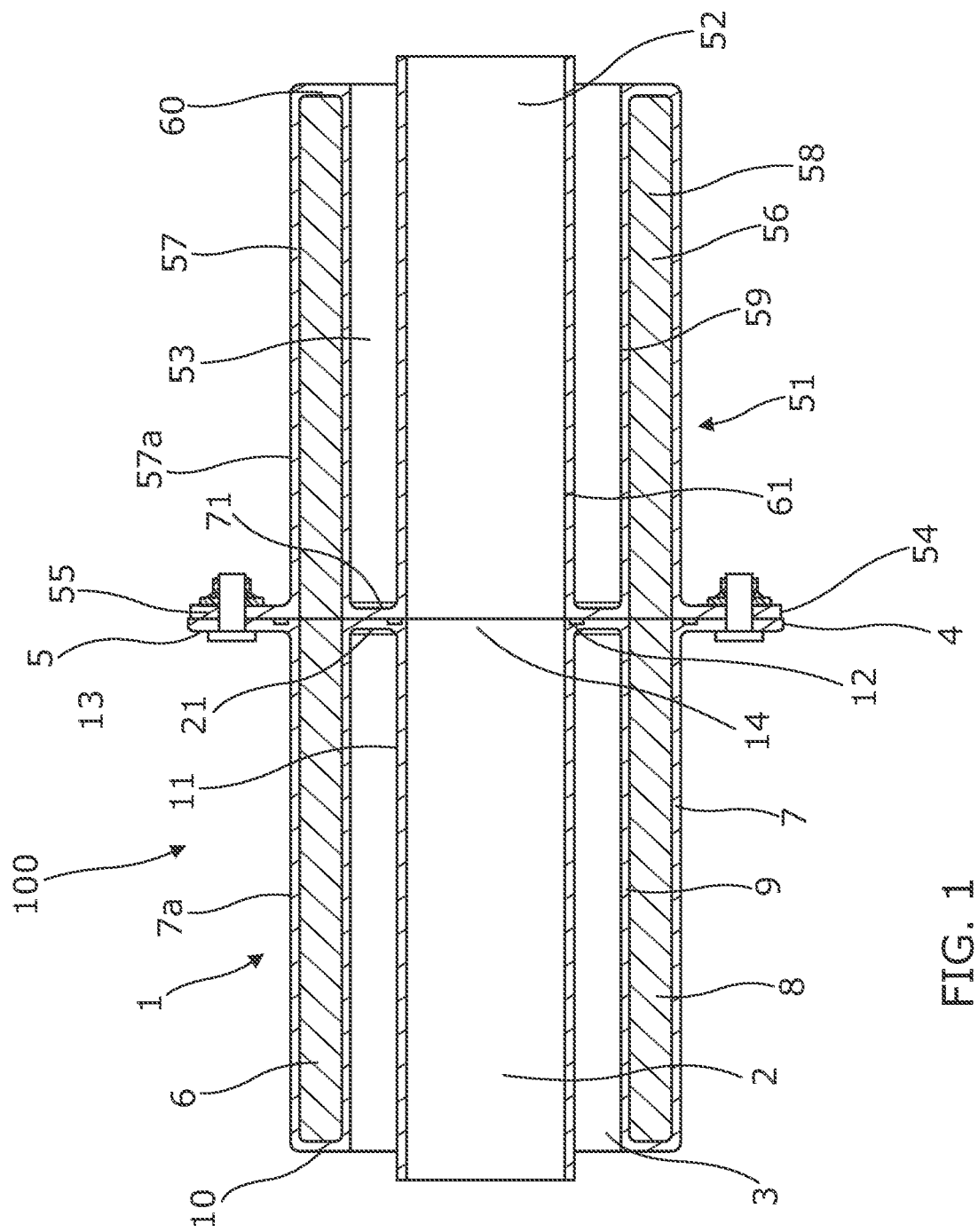
FIG. 1 shows a schematic cross-sectional view of a coupling according to a first embodiment of the invention.
Figure 2:
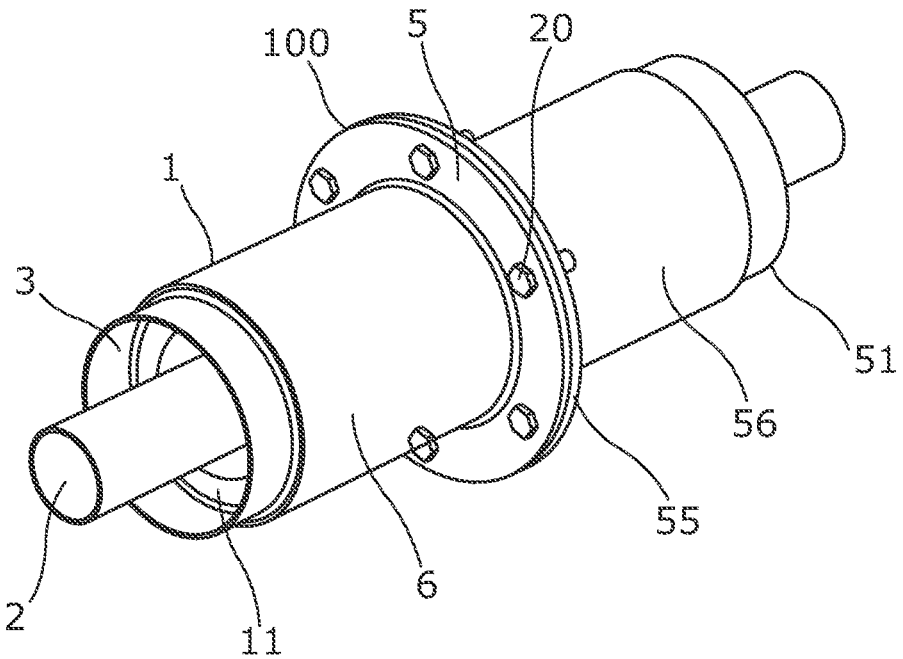
FIG. 2 shows a schematic perspective view of the coupling of FIG. 1.

An embodiment of a coupling in accordance with the first, second, third and fourth aspects of the present invention will now be described by way of example only with reference to FIGS. 1 and 2. The coupling is denoted generally by reference numeral 100 and is suitable for coupling insulated piping, in this case, vacuum-insulated piping. The coupling 100 comprises first 1 and second 51 parts for forming the coupling. Each of the first 1 and second parts 51 comprises an inner portion 2, 52 for interfacing with an inner part of a vacuum-insulated pipe and an outer portion 3, 53 for interfacing with an outer, low pressure part of a vacuum-insulated pipe. The inner portions 2, 52 of the first and second parts form an inner region 14 for the passage of fluid therethrough. In this connection, vacuum-insulated piping typically comprises an inner pipe that carries a fluid, usually a liquid, that should be kept cold, and an outer pipe. The space between the inner and outer pipe of the vacuum-insulated piping is typically at a reduced pressure to inhibit heat transfer from the ambient environment to the fluid in the inner pipe. The inner pipe of the vacuum-insulated piping interfaces with the inner portions 2, 52 of the coupling so that fluid (for example, a cooled liquid, such as hydrogen) can be transferred through the coupling. The outer, low-pressure part of the vacuum-insulated interfaces with the outer portion of the coupling so that the space in the outer portion of the coupling may be subjected to the same low pressure that is generated in the low-pressure part of the vacuum-insulated piping. For the avoidance of doubt, "outer portion" refers to the position of said portion relative to the "inner portion". The term "outer" does not refer to the position of the "outer portion" relative to features of the coupling other than the "inner portion".

Each of the first 1 and second 51 parts comprises an interface portion 4, 54 for forming an interface with the interface portion of the other of the first and second parts. In the present case, each interface portion 4, 54 has generally a generally flat face that contacts the generally flat face of the interface portion 4, 54 of the other of the first 1 and second 51 parts. Each interface portion 4, 54 comprises a flange 5, 55 for connecting the first 1 and second 51 parts. The flanges 5, 55 are generally annular in shape as can best be seen in FIG. 2. The flanges 5, 55 abut one another, and each flange 5, 55 is provided with a plurality of apertures for the receipt of bolts, one of which is labelled with reference numeral 20. Nuts and bolts 20 are used to secure the flanges 5, 55, and therefore the first 1 and second 51 parts, together. The flanges 5, 55 are approximately 5 mm thick.

Each interface portion 4, 54 comprises an interface second portion 21, 71, which is inward of the flange. The interface portion extends radially from the interface second portion 21, 71 to the respective flange. The interface second portions are substantially annular in shape, and abut one another. The interface second portions 21, 71 are proximate to inner portions 2, 52 of the first and second parts of the coupling.

The use of flanges to help connect two parts of a coupling is known, and is a convenient way of attaching two parts of a coupling. However, the thermal performance of such flanged couplings is usually not as good as other couplings, such as bayonet couplings. The applicant has discovered, however, that it is possible to improve the thermal performance of such flanged couplings by providing a sleeve 6, 56 that surrounds the respective outer portion 3, 53, the sleeve 6, 56 comprising a thermally-conductive portion 7, 57, that extends away from the interface portion 4, 54. Each thermally-conductive portion 7, 57 comprises an outer wall 7a, 57a and an inner wall, 9, 59 that, together with a respective end wall 10, 60 provide a long thermally-conductive path between flanges 5, 55 and inner interface portions 21, 71. In this connection, the thermally-conductive portion extends away from the flange to a region remote from the flange (exemplified by the end wall 10, 60), and extends from the region remote from the flange to the respective interface second portion 21, 71. Furthermore, in a conventional, known coupling, there would typically be a direct, radial thermally conductive path between the flange and the inner interface portion. In the present case, and as explained in further detail below, there is no direct, radial thermally-conductive path between the flange and the respective interface second portion. In this connection, there is a thermally-insulative portion in the form of thermal insulator 8, 58 between the flange and the interface second portion, thereby providing a thermally-insulative path in a radial direction between the flange and the respective interface second portion. The long conductive path provided by thermally-conductive portion 7, 57, coupled with the radial thermally-insulative path, reduces conducted heat transfer between the ambient environment and the cold liquid typically carried by the coupling.

Outer wall 7a, 57a is made from 2 mm thick stainless steel and extends approximately 115-120 mm from the respective interface portion 4, 54.

Each sleeve 6, 56 comprises a cylinder of thermal insulator 8, 58, in this case ULTEM® 1000. The walls of the cylinder are approximately 15 mm thick. The thermal insulator 8, 58 inhibits heating of the fluid carried in the inner portion 2, 52 of the coupling. Without wishing to be bound by theory, it is anticipated that the thermal insulator reduces convected and radiated heat transfer between the ambient environment and the cold liquid typically carried in the coupling. Furthermore, the thermal insulator 8, 58 provides structural rigidity to the coupling. The thermal insulator 8, 58 is bounded, and retained in place by, thermally-conductive stainless outer wall 7a, 57a, a 4 mm thick end wall 10, 60 and 2 mm thick sleeve inner wall 9, 59. The applicant has discovered that it is beneficial for the sleeve to comprise a thermally-insulative material to inhibit heating of the contents of the inner portion 2, 52 of the coupling. The applicant has discovered that it is particularly beneficial to provide the thermally-insulative material in combination with a thermally-conductive material that provides a long thermally-conductive path between flange 5, 55 and interface second portion 21, 71.

Each of the first 1 and second 51 parts of the coupling 100 comprises an inner conduit portion 11, 61 in the form of a cylindrical conduit. The inner conduit portion 11, 61 interfaces with an inner tube of a vacuum-insulated pipe. Each inner conduit portion meets the other inner conduit portion at the interface portion 4, 54. Each inner conduit portion 11, 61 extends past the end of the respective sleeve 6, 56, providing an easily-accessible portion of conduit for attachment to the inner pipe of a vacuum-insulated pipe.

The outer portion 3, 53 of the respective first 1 and second 51 part is defined by the respective inner conduit portion 11, 61 and the respective sleeve inner wall 9, 59. The low-pressure portion of vacuum-insulated piping interfaces with the external surface of the inner conduit portion 11, 61 and the sleeve inner wall 9, 59.

The flat face of interface portion 4 of first part 1 is provided with an inner seal member 12 and an outer seal member 13, each being in the form of a cryogenically-compatible washer. Both the inner seal member 12 and outer seal member 13 are located in a respective annular groove (not shown) that has been formed in the flat face of interface portion 4. Both the inner seal member 12 and outer seal member 13 form a seal against the flat face of interface portion 54 of second part 2. First seal member 12 is located outward of inner portion 2 and inward of sleeve 6, and inhibits leakage of fluid from inner portion 14. Second seal member is located outward of sleeve 6, and inhibits ingress of air.

In the embodiment above, the coupling 100 is designed to interface with a 3.5" (88.9 mm) diameter vacuum-insulated pipe. The applicant has discovered that the length of the sleeve comprising the thermally-conductive portion may vary, and may still provide good thermal performance. For example, a sleeve of length of 110-120 mm provides good thermal performance, when used with a thermal insulator of 15 mm thickness. A sleeve of length of 195-200 mm also provides good thermal performance, but in this case a thinner thermal insulator may be used, in this case a thermal insulator of 10 mm thickness. This suggests that the length of the sleeve may optionally be about the same as the diameter of the vacuum-insulated pipe.

Interface portions 4, 54 each comprise an interface second portion 21, 71 in the form of an annular wall that abut one another in the coupling. In coupling 100 the interface second portion 21, 71 is not provided with any fluid flow passages that permit fluid communication between outer portions 3, 53. It is possible to provide fluid communication between outer portions 3, 53. In such a case, a reduction in pressure in, say, outer portion 3 will lead to a reduction in pressure is outer portion 53. This allows a single vacuum pump to reduce pressure across a coupling.

Figure 4A:
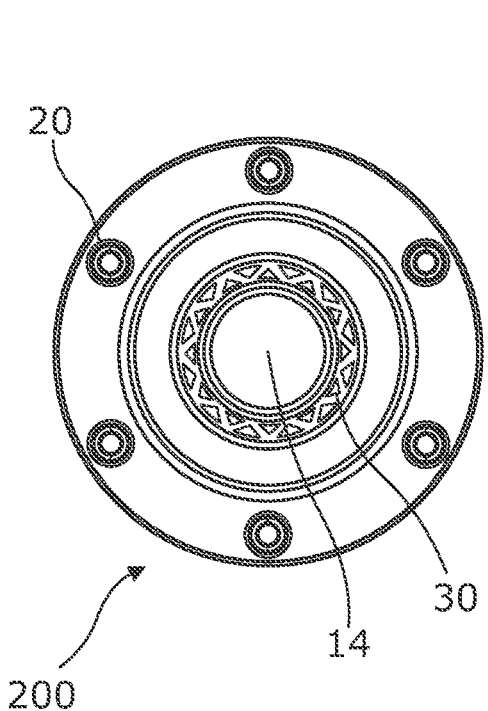
FIG. 4a shows an end-on view of a coupling according to another embodiment of the invention.
Figure 4B:
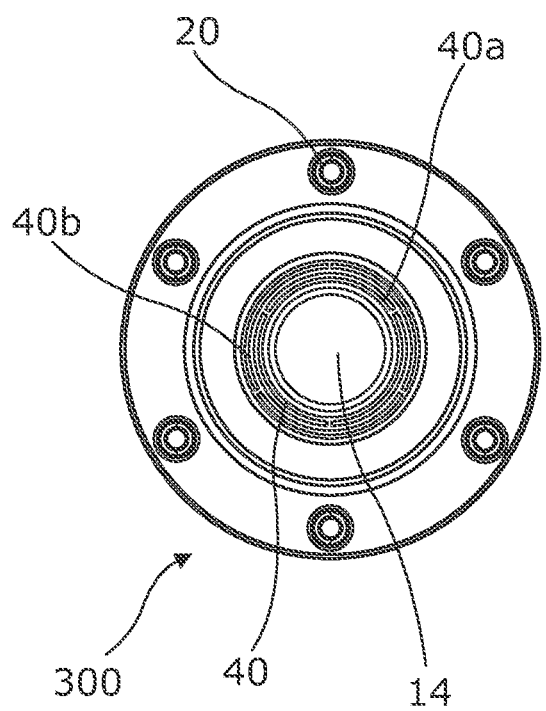
FIG. 4b shows an end-on view of a coupling according to yet another embodiment of the invention.
Figure 3:
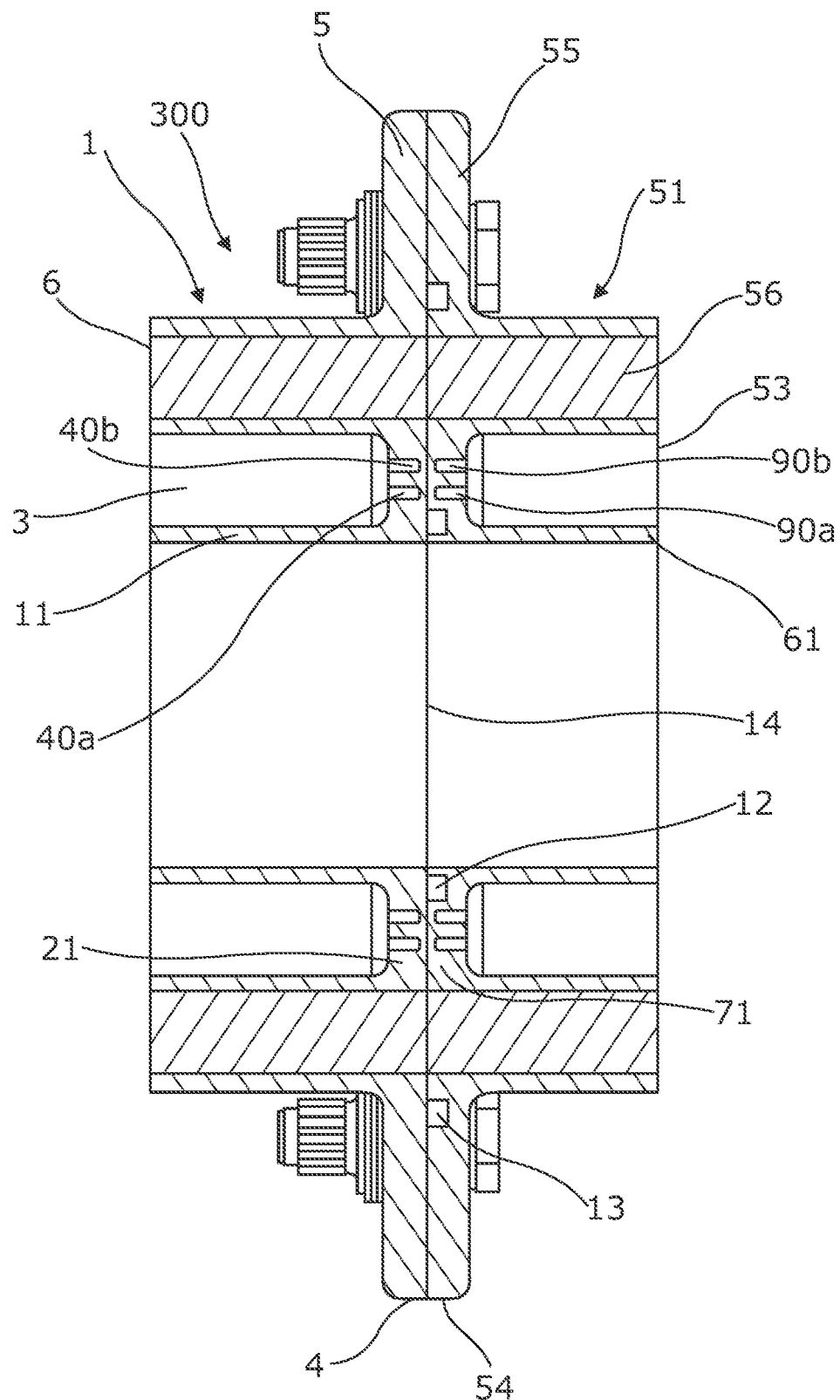
FIG. 3 shows a schematic cross-sectional view of a coupling according to a further embodiment of the invention.

In the couplings of FIGS. 3, 4a and 4b there is no fluid communication between outer portions 3, 53, but there is a reduction in the thickness of the second interface portions 21, 71 so that there is reduced thermal conductivity between fluid in the coupling and the ambient atmosphere. Referring to FIG. 3, coupling 300 comprises inner interface portions 21, 71 in the form of annular walls, which are provided with deep recesses 40a, b, 90a, b that extend into the annular walls. The recesses do not extend the whole way through the thickness of the respective wall and therefore there is no fluid communication between the outer portions 3, 53 of first 1 and second 2 parts. The recesses may be filled with a thermally non-conductive material. FIG. 4b shows the end-on view of the coupling 300, and shows the general shape of recesses 40a, b. For the avoidance of doubt, the features depicted by reference numerals in FIGS. 3 and 4b relate to features having the same reference numerals in FIGS. 1 and 2.

Alternative arrangements of recesses are possible. In this connection, FIG. 4a shows a different arrangement of recesses 30.

The examples above not only describe embodiments of couplings in accordance with the first, second, third and fourth aspects of the present invention, but also describe embodiments of first and second parts of the coupling in accordance with the fifth aspect of the present invention.

Figure 5A:
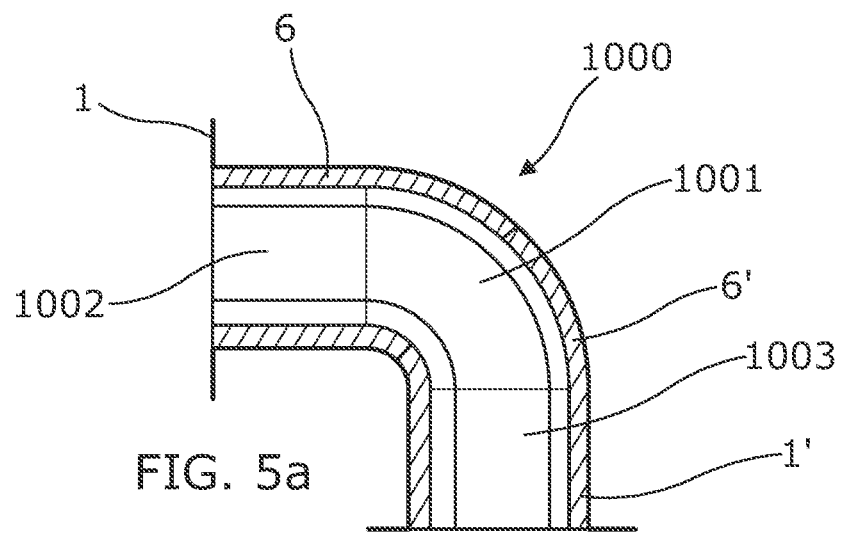
FIG. 5a shows a schematic side-on view of a vacuum-insulated pipe according to an embodiment of the invention.

Various embodiments of insulated pipes (in this case, vacuum-insulated pipe) in accordance with the seventh aspect of the present invention will now be described by way of example only with reference to FIGS. 5a-5e. Vacuum-insulated piping 1000 comprises vacuum-insulated pipe 1001, which is in the form of a right-angled bend. Pipe 1001 comprises a first part 1 of a coupling attached to a first connecting region 1002 and another first part 1' of a coupling attached to a second connecting region 1003. Sleeve 6 and sleeve 6' meet as shown in FIG. 5a.

Figure 5B:
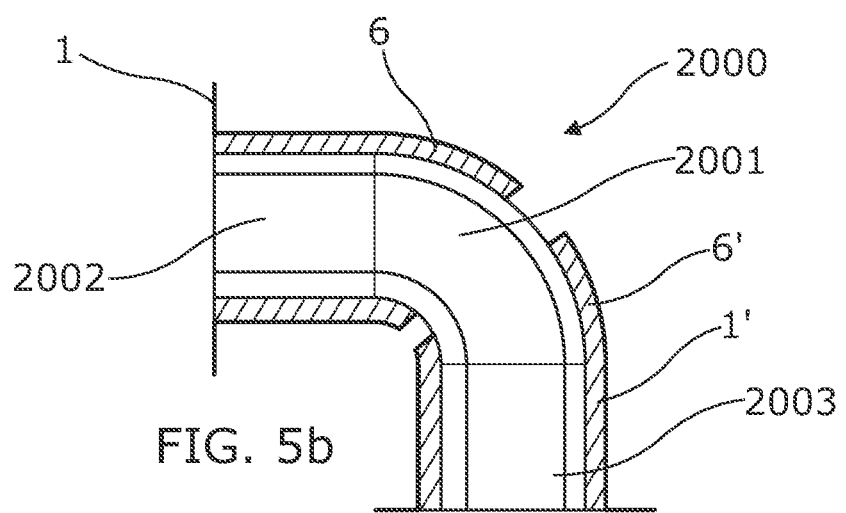
FIG. 5b shows a schematic side-on view of a vacuum-insulated pipe according to another embodiment of the invention.

Referring to FIG. 5b, vacuum-insulated piping 2000 comprises vacuum-insulated pipe 2001, which is in the form of a right-angled bend. Pipe 2001 comprises a first part 1 of a coupling attached to a first connecting region 2002 and another first part 1' of a coupling attached to a second connecting region 2003. In a contrast to the arrangement of FIG. 5a, sleeve 6 and sleeve 6' are curved but do not meet, as shown in FIG. 5b.

Figure 5C:
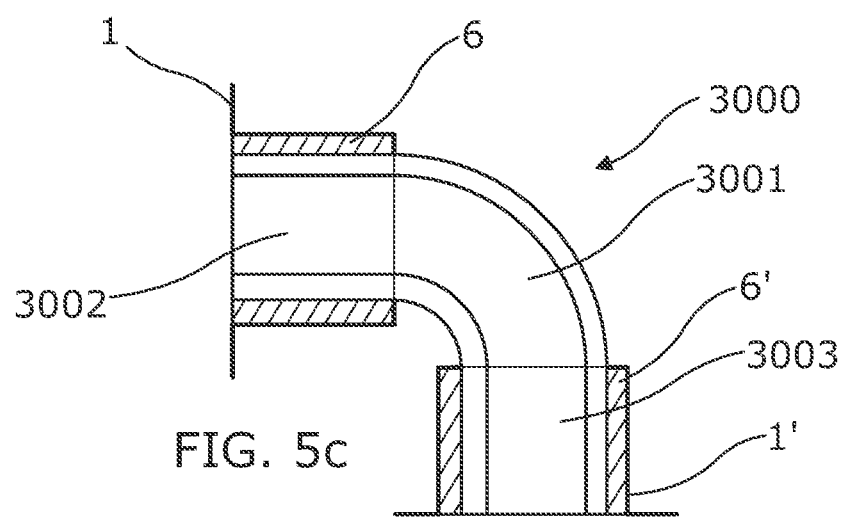
FIG. 5c shows a schematic side-on view of a vacuum-insulated pipe according to a further embodiment of the invention.

Referring to FIG. 5c, vacuum-insulated piping 3000 comprises vacuum-insulated pipe 3001, which is in the form of a right-angled bend. Pipe 3001 comprises a first part 1 of a coupling attached to a first connecting region 3002 and another first part 1' of a coupling attached to a second connecting region 3003. In a contrast to the arrangement of FIG. 5a, sleeve 6 and sleeve 6' are straight but do not meet, as shown in FIG. 5c.

Figure 5D:
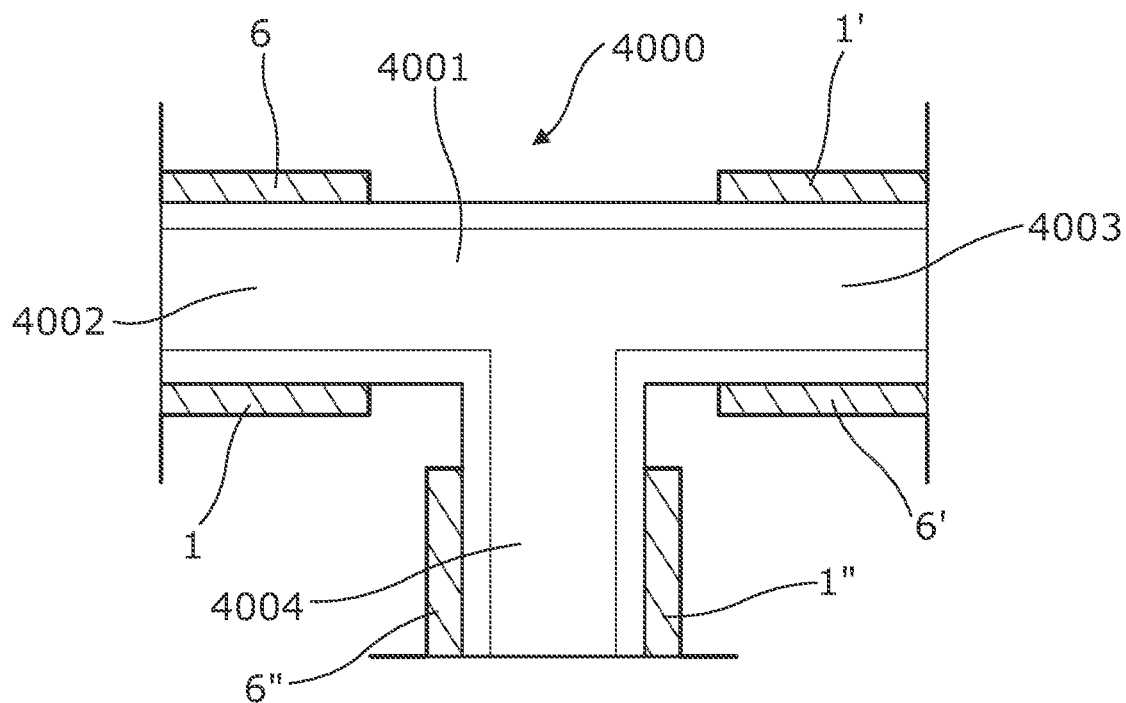
FIG. 5d shows a schematic side-on view of a vacuum-insulated pipe according to yet another embodiment of the invention.
Figure 5E:
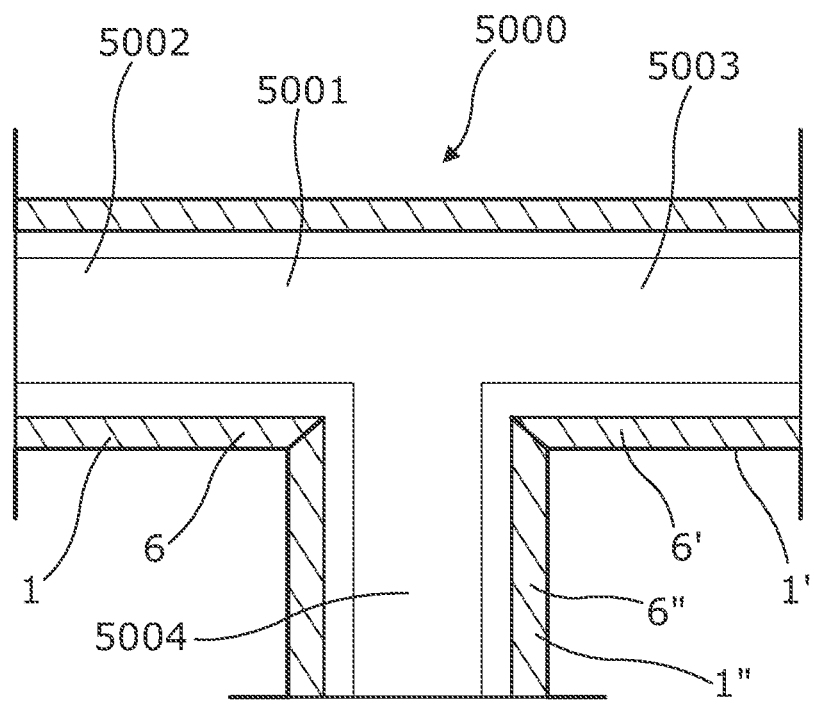
FIG. 5e shows a schematic side-on view of a vacuum-insulated pipe according to yet a further embodiment of the invention.

The embodiments of FIGS. 5d and 5e show T-shaped vacuum-insulated piping. Referring to FIG. 5d, vacuum-insulated piping 4000 comprises vacuum-insulated pipe 4001, which is in the form of a T-shape. Pipe 4001 comprises a first part 1 of a coupling attached to a first connecting region 4002, another first part 1' of a coupling attached to a second connecting region 4003, and yet another first part 1" of a coupling attached to a third connecting region 4004. Sleeves 6, 6' and 6" do not meet, as shown in FIG. 5d.

Referring to FIG. 5e, vacuum-insulated piping 5000 comprises vacuum-insulated pipe 5001, which is in the form of a T-shape. Pipe 5001 comprises a first part 1 of a coupling attached to a first connecting region 5002, another first part 1' of a coupling attached to a second connecting region 5003, and yet another first part 1" of a coupling attached to a third connecting region 5004. Sleeves 6, 6' and 6" meet, as shown in FIG. 53.

Figure 6:
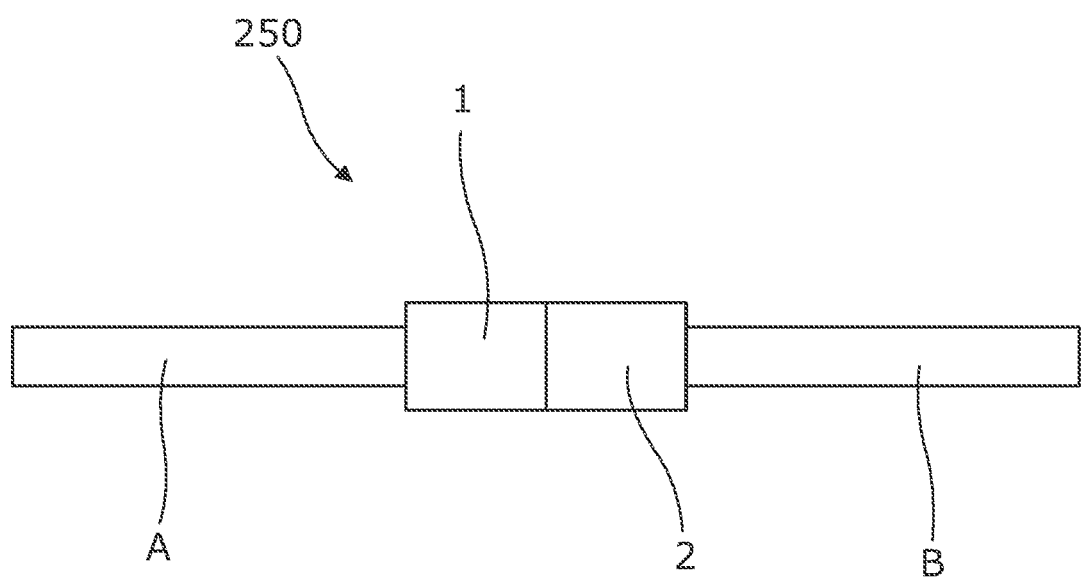
FIG. 6 shows a schematic representation of a vacuum-insulated piping arrangement according to an embodiment of the invention.

An embodiment of an insulated piping arrangement (in this case, a vacuum-insulated piping arrangement) in accordance with the eighth aspect of the present invention will now be described by way of example only with reference to FIG. 6. The piping arrangement is denoted generally by reference numeral 250, and comprises a first section of vacuum-insulated pipe A attached to first part 1 of coupling 100. A second section of vacuum-insulated pipe B is attached to second part 51 of coupling 100.

Figure 7:
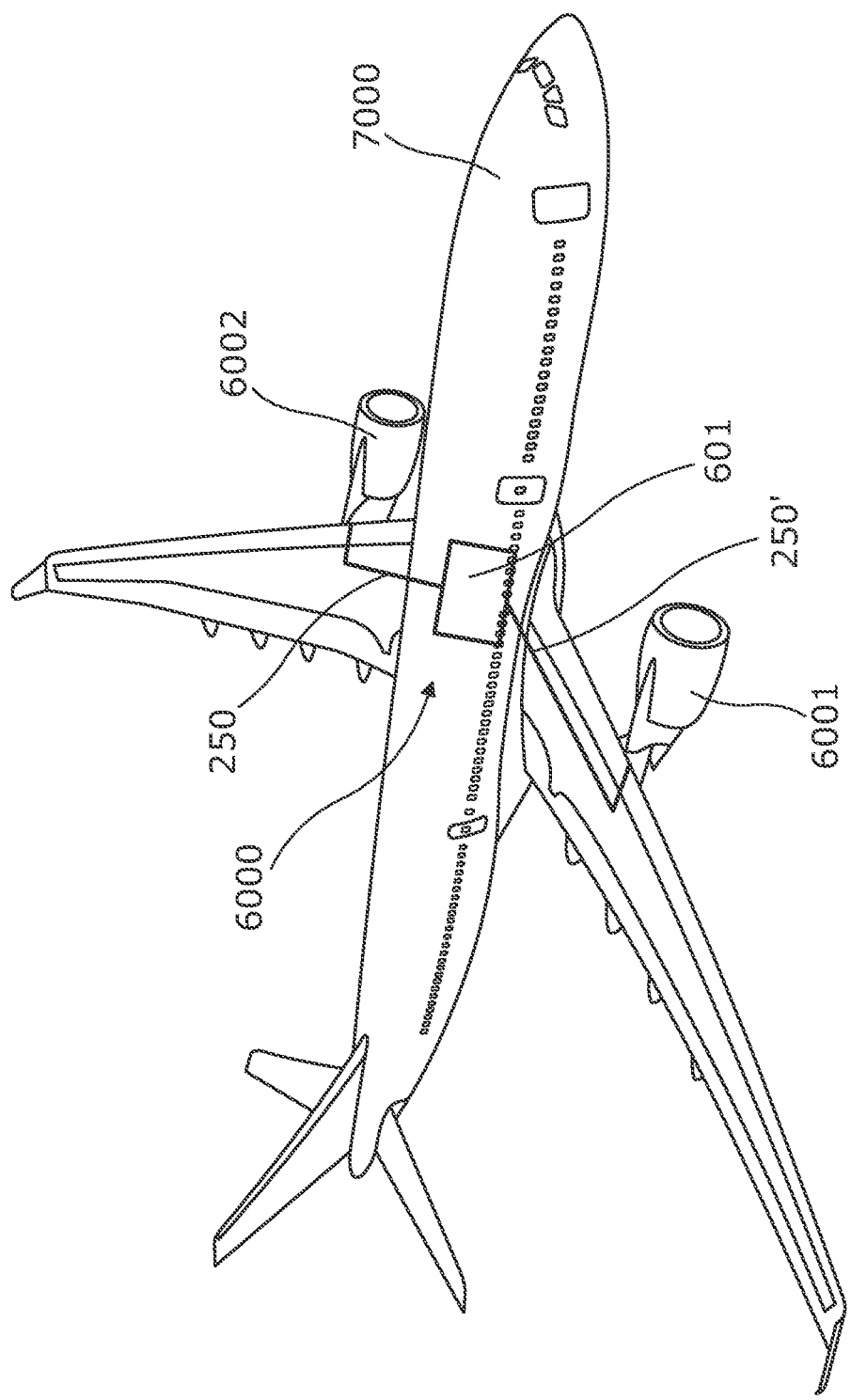
FIG. 7 shows an aircraft according to an aspect of the invention, the aircraft comprising a fuel delivery arrangement and an aircraft according to an aspect of the invention.

An embodiment of a fuel delivery arrangement in accordance with a tenth aspect of the invention will now be described by way of example only with reference to FIG. 7. A fuel delivery arrangement is denoted generally by reference numeral 6000 and comprises fuel tank 601 configured to deliver fuel to two jet engines 6001, 6002 through a vacuum-insulated piping arrangement 250, 250'. In the present case, the fuel is hydrogen. Those skilled in the art will realise that the engines 6001, 6002 are not part of the fuel delivery arrangement. FIG. 7 also shows an embodiment of a vehicle in accordance with the eleventh aspect of the present invention. The vehicle, in this case a narrow bodied jet aircraft 7000 comprises fuel delivery arrangement 6000.

Figure 8:
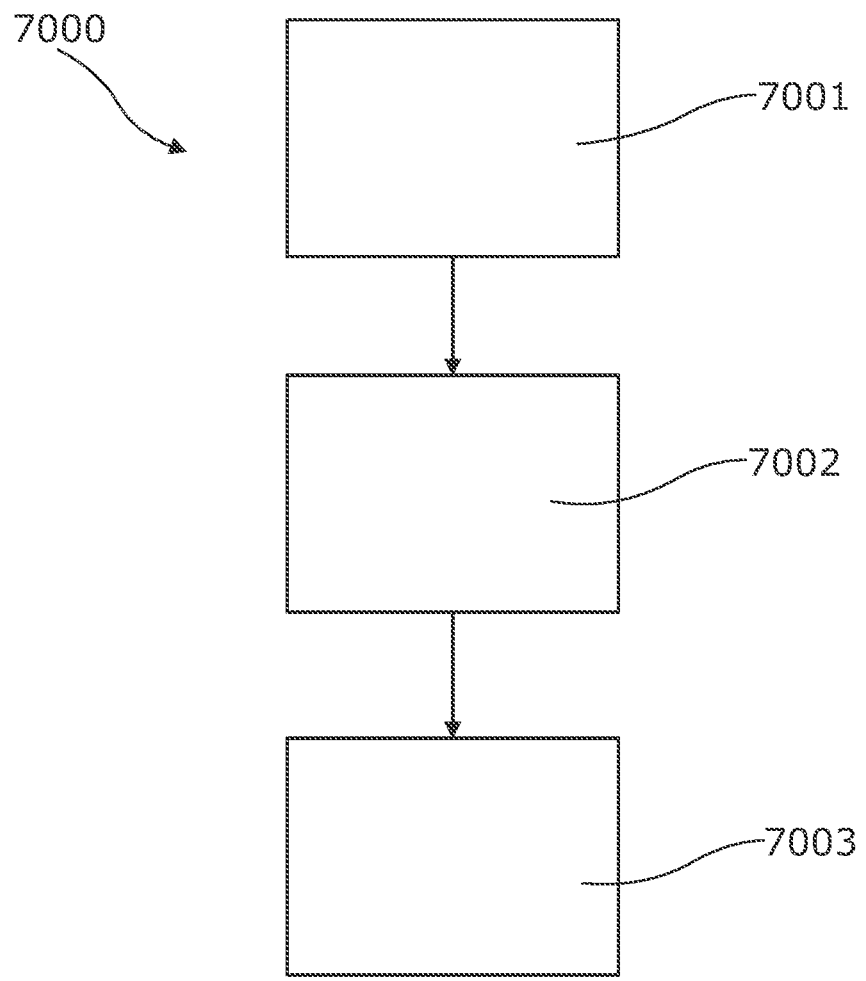
FIG. 8 shows a schematic representation of an embodiment of a method of supplying a chilled liquid fuel according to an aspect of the invention.

An embodiment of a method of supplying a chilled liquid fuel in accordance with an embodiment of the twelfth aspect of the invention by way of example only will now be described with reference to FIGS. 7 and 8. The method is denoted general by reference numeral 7000, and comprises moving 7001 said chilled liquid fuel (in this case, liquid hydrogen) from a fuel tank 601, passing 7002 the chilled liquid fuel through a coupling 1, and passing 7003 the chilled liquid fuel to an engine 6001 for using the fuel.

Figure 9:
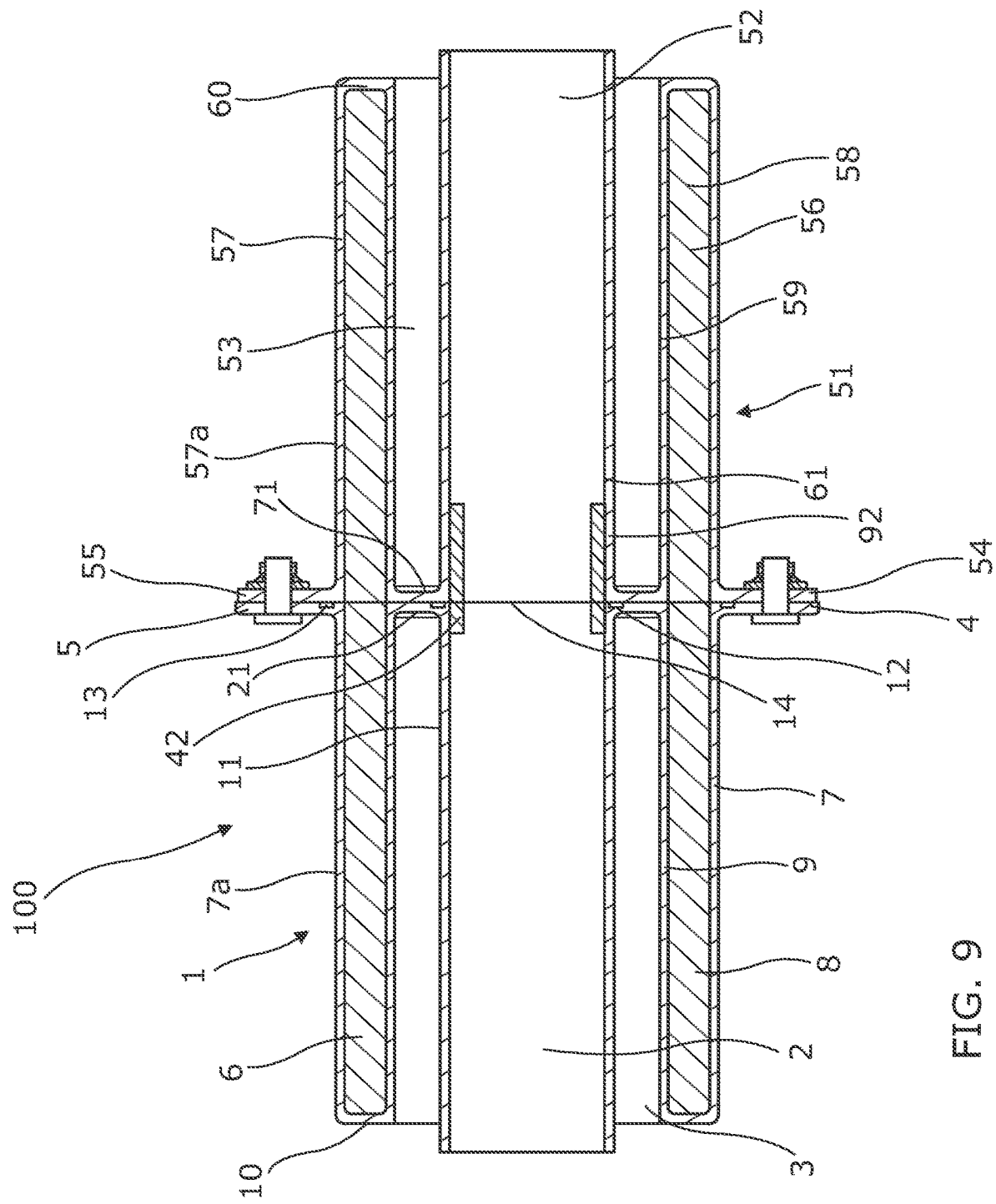
FIG. 9 shows a schematic cross-sectional view of an example of a coupling according to a further embodiment of the invention.

An embodiment of a further coupling in accordance with the first, second, third and fourth aspects of the present invention will now be described by way of example only with reference to FIG. 9. The coupling 100 is substantially as described above in relation to FIGS. 1 and 2, and reference numerals used in FIG. 9 are for features that carry the same reference numerals in FIGS. 1 and 2. The coupling 100 of FIG. 9 differs from that of FIGS. 1 and 2 in that the coupling of FIG. 9 comprises features that provide a thermally-driven engagement between the first and second parts. In this connection, inner conduit portion 11 of first part 1 comprises projection 42 that is formed from a cylinder of invar that is welded to the internal surface of the rest of the inner conduit portion 11. Inner conduit portion 61 provides projection-receiving portion 92, which has the same cross-sectional area as the rest of the inner conduit portion 61. Projection 42 is received by projection-receiving portion 92 of inner conduit portion 61. As cold liquid, in this case, liquid hydrogen, is passed through inner portion 14, inner conduit portions 11, 61 cool and contract. Projection-receiving portion 92 has a far greater co-efficient of thermal expansion than projection 42, and therefore contracts far more than projection 42. This brings projection-receiving portion 92 into engagement with projection 42. This may increase the effectiveness of the seal between the first and second parts, inhibiting egress of fluid from inner region 14. This engagement also reduces the risk of the unwanted decoupling of the coupling.

Figure 10:
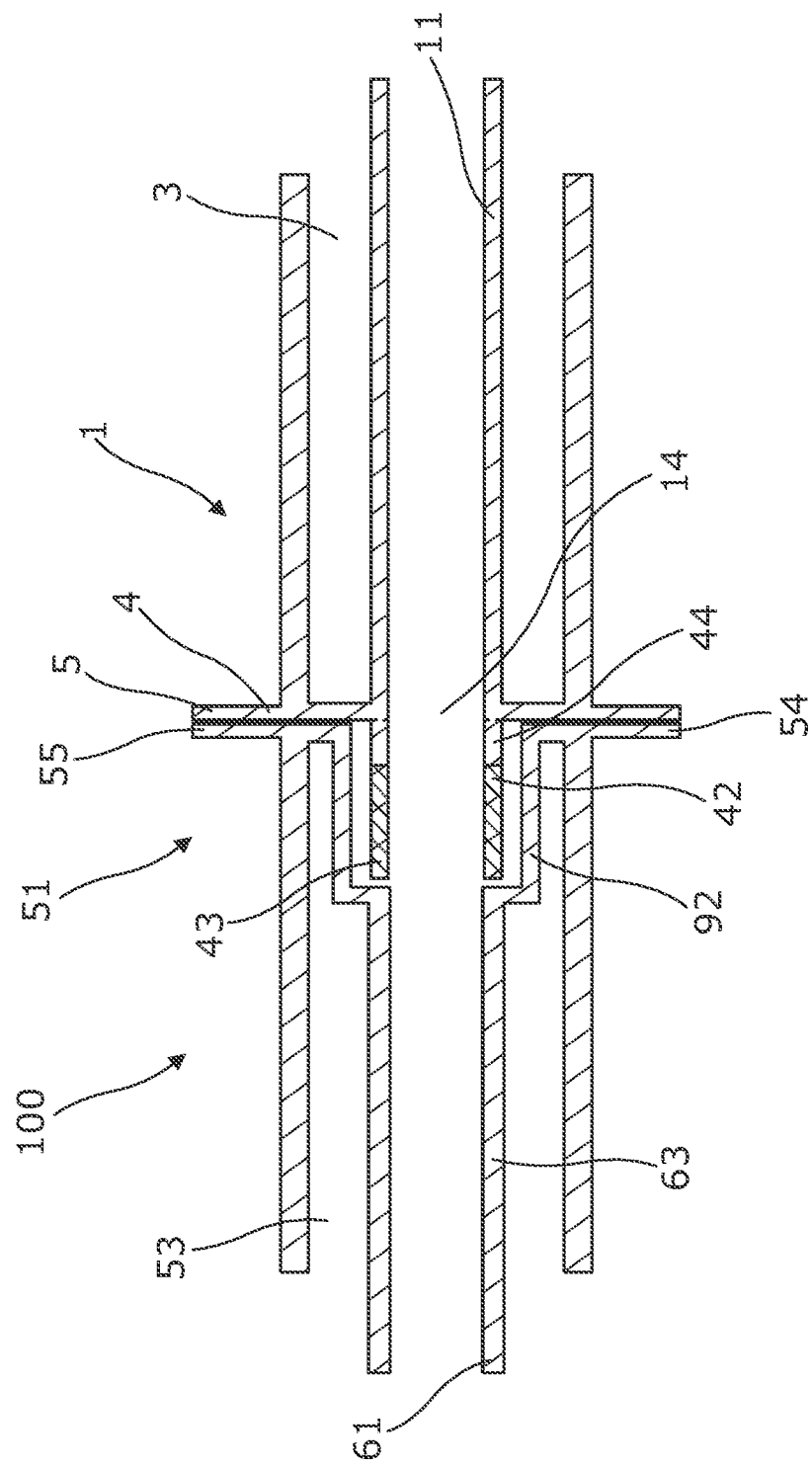
FIG. 10 shows a schematic cross-sectional view of an example of a coupling according to yet another embodiment of the invention

A further embodiment of a coupling in accordance with the first, second, third and fourth aspects of the present invention will now be described by way of example only with reference to FIG. 10. The coupling 100 is substantially as described above in relation to FIGS. 1 and 2, and reference numerals used in FIG. 10 are for features that carry the same reference numerals in FIGS. 1 and 2, except that the details of the sleeve arrangement of FIGS. 1 and 2 have been omitted from FIG. 10 for clarity. The coupling 100 of FIG. 10 differs from that of FIGS. 1 and 2 in that the coupling of FIG. 10 comprises features that provide a thermally-driven engagement between the first and second parts. Inner conduit portion 11 of first part 1 comprises a projection 42 that extends from the interface portion 4. Projection 42 is cylindrical, and comprises a tip portion 43 and a base portion 44. Tip portion 43 is substantially cylindrical in shape and is about 30 mm long, and is made from invar, a material having a low co-efficient of thermal expansion. Tip portion 42 has been welded to base portion 44. Base portion 44 is contiguous with the part of the inner conduit portion 11 that does not protrude from the interface region 4. The base portion 44 and the part of the inner conduit portion 11 that does not protrude from the interface region 4 are formed from steel. In use, projection 42 is received within a projection-receiving portion 92 provided in the second part 51. Projection-receiving portion 92 is substantially cylindrical in shape and is sufficiently large to accommodate projection 42. Projection-receiving portion 92 is formed from steel, which has a far greater co-efficient of thermal expansion than invar, from which the tip portion 43 of projection 42 is formed. Projection-receiving portion 92 is part of inner conduit portion 61, but has a greater diameter than the rear part 63 of inner conduit portion 61.

Before use, clamps are used to secure flanges 5, 55 together. This compresses inner and outer seal members, inhibiting egress of fluid from inner portion 14 and inhibiting ingress of ambient air.

As cold liquid, in this case, liquid hydrogen, is passed through inner portion 14, inner conduit portions 11, 61 cool and contract. Projection-receiving portion 92 has a far greater co-efficient of thermal expansion that tip portion 43, and therefore contracts far more than tip portion 43. This brings projection-receiving portion 92 into engagement with tip portion 43. This may increase the effectiveness of the seal between the first and second parts, inhibiting egress of fluid from inner region 14. This engagement also reduces the risk of the unwanted decoupling of the coupling.

For the avoidance of doubt, those skilled in the art will realise that the vacuum-insulated piping is not part of the coupling of the present invention.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above describe how the first and second parts of the coupling are each provided with an inner conduit that is welded to an inner pipe of the vacuum-insulated pipe. Those skilled in the art will realise that the first and second parts of the coupling need not be provided with an inner conduit. Furthermore, the inner conduit, if present, may interface with the inner pipe of the vacuum-insulated pipe in a manner different from that shown above. For example, substantially the whole length of the inner conduit may receive, or be received by, the inner pipe of the vacuum-insulated pipe.

The examples above describe how the sleeve is welded to the outer pipe of the vacuum-insulated pipe. Those skilled in the art will realise that other arrangements are possible. For example, substantially the whole length of the sleeve may receive the outer pipe of the vacuum-insulated pipe.

The examples above describe how the flanges of the first and second parts may be attached to one another using nuts and bolts. Those skilled in the art will realise that other means of attachment may be used. For example, one or more clamps may be used to attach the flanges together.

The examples above describe the use of a sleeve with both a thermally-conductive portion and a thermally-insulative portion. While it is generally preferred for the sleeve to comprise both a thermally-conductive portion and a thermally-insulative portion, those skilled in the art will realise that, for a coupling in accordance with the first aspect of the present invention, a thermally-insulative portion is not required. Similarly, those skilled in the art will realise that, for a coupling in accordance with the second aspect of the present invention, a thermally-conducting portion is not required.

The examples above describe the use of ULTEM® as a thermally-insulative material. Those skilled in the art will realise that other thermally-insulative materials may be used. For example, closed-cell polyurethane foam, closed-cell glass foam and/or glass-fibre reinforced polymer may be used.

The examples above describes the use of a coupling for a hydrogen fuel delivery system. Those skilled in the art will realise that the coupling may be used with other vacuum-insulated pipes.

The examples above describe a coupling for vacuum-insulated piping. Those skilled in the art will realise that the coupling could be used for other insulated piping. For example, the coupling could be used in conjunction with piping that is insulated with a thermally-insulative, optionally solid, material, such as a foam (e.g. polyurethane foam or glass foam), Aerogel or microspheres, such as glass microspheres.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A coupling for insulated piping, the coupling comprising:
   first and second parts for forming the coupling;
   each of the first and second parts comprising an inner portion for fluid communication with an inner part of an insulated pipe and an outer portion for communication with an outer insulative part of an insulated pipe;
   the inner portions of the first and second parts being suitable for forming an inner region for the passage of fluid therethrough;
   each of the first and second parts comprising an interface portion for forming an interface with an interface portion of the other of the first and second parts, the interface portion comprising a flange for connecting the first and second parts, and an interface second portion located inward of the flange, the interface portion extending radially outwards from the interface second portion to the flange;
   wherein at least one of the first and second parts comprises a thermally-insulative portion between the flange and the interface second portion, thereby providing a thermally-insulative path in a radial direction between the flange and the interface second portion;
   at least one of the first and second parts comprises a thermally-conductive portion that extends away from the interface portion and which provides a thermally-conductive path between the flange and the interface second portion;
   wherein the thermally-conductive portion comprises an outer wall exposed to an outside of the coupling; and,
   wherein the thermally-conductive portion bounds the thermally-insulative portion.

2. The coupling of claim 1, wherein the thermally-conductive portion extends away from the flange to a region remote from the flange, and extends from the region remote from the flange to the interface second portion.

3. The coupling of claim 1, wherein the interface second portion is proximate to, and outward of, the inner portion.

4. The coupling of claim 1, wherein the interface second portion comprise a portion of reduced conductive cross-section, the portion of reduced conductive cross-section comprising one or more recesses or apertures in the interface second portion, the one or more of the recesses or apertures being provided with a solid thermally-insulative material.

5. The coupling of claim 1, wherein each of the first and second parts comprises an inner conduit portion for interfacing with the insulated pipe and the insulated pipe is an inner vacuum insulated pipe, wherein the inner conduit portion extends past the respective thermally-conductive portion, wherein the inner conduit portion and the thermally-conductive portion define a space for interfacing with an insulative region of the insulated pipe.

6. The coupling of claim 5, wherein the inner conduit portion of the first part comprises a projection, and the second part comprises a projection-receiving portion for receiving the projection of the first part, the projection comprises a lower thermal expansion region having a first co-efficient of thermal expansion, and the projection-receiving portion has a second co-efficient of thermal expansion, the second co-efficient of thermal expansion being greater than the first co-efficient of thermal expansion;
   wherein the projection and projection-receiving portion are configured so that the projection-receiving portion engages the projection when cooled to temperatures associated with the passage of cold liquid through the inner conduit portions, the temperature being no more than −200° C. and no less than −260° C.; and
   wherein the inner conduit portion of the second part comprise the projection-receiving portion, the inner conduit portion of the second part comprising a non-receiving portion that does not receive the projection, the diameter of the projection-receiving portion being greater than that of the non-projection receiving portion.

7. The coupling of claim 1, wherein the first and second part comprises the thermally-insulative portion surrounding the outer portion, wherein the thermally-insulative portion is cylindrical in shape, and, the thermally-conductive portion comprises a first thermally-conductive portion inwards of the thermally-insulative portion and a second thermally-conductive portion outwards of the thermally-insulative portion.

8. The coupling of claim 1, wherein one of the first and second part is provided with a first seal-forming member and a second seal-forming member, wherein the first seal-forming member is located outward of the inner portion and inward of the outer portion, and the second seal-forming member is located outwards of the thermally-conductive portion, wherein the first and second parts are provided with passages that together provide one or more flow paths for the outer regions of the first and second parts.

9. The coupling of claim 1, wherein the coupling is a coupling for vacuum-insulated piping, each of the first and second parts comprising the inner portion is for fluid communication with an inner part of a vacuum-insulated pipe and the outer is portion for fluid communication with an outer low-pressure part of a vacuum-insulated pipe.

10. A coupling for insulated piping, the coupling comprising:
    first and second parts for forming the coupling,
    each of the first and second parts comprising an inner portion for fluid communication with an inner part of an insulated pipe, and an outer portion for communication with an outer insulative part of an insulated pipe,
    the inner portions of the first and second parts being suitable for forming an inner region for the passage of fluid therethrough,
    at least one of the first and second parts comprises a sleeve surrounding the outer portion, the sleeve comprising a thermally-insulative portion surrounding the outer portion,
    wherein the at least one of the first and second parts comprises a thermally-conductive portion comprising an outer wall exposed to an outside of the coupling, and
    wherein the thermally-conductive portion bounds the thermally-insulative portion.

11. A coupling according to claim 10, wherein the outer portion comprises a thermally-conductive portion that is in thermal communication with an interface portion so as to conduct heat away from the interface portion, or at least one of the first and second parts comprises a flange and an interface second portion located inwards of the flange, wherein the outer portion comprises a thermally-conductive portion that extends away from an interface portion and which provides a thermally-conductive path between the flange and the interface second portion.

12. A coupling for insulated piping, the coupling comprising:
    first and second parts for forming the coupling;
    each of the first and second parts comprising an inner portion for fluid communication with an inner part of an insulated pipe and an outer portion for communication with an outer insulative part of an insulated pipe;

the inner portions of the first and second parts being suitable for forming an inner region for the passage of fluid therethrough;

each of the first and second parts comprising an interface portion for forming an interface with interface portion of the other of the first and second parts, the interface portion comprising a flange for connecting the first and second parts, at least one of the first and second parts comprising a thermally-conductive portion that extends away from the interface portion, wherein the thermally-conductive portion comprises an outer wall exposed to an outside of the coupling, and wherein the thermally-conductive portion bounds the thermally-insulative portion.

13. The coupling of claim 12, comprising a sleeve, which sleeve comprises the thermally-conductive portion and a thermally-insulative portion, wherein the outer wall is located outward of the thermally-insulative portion and an inner wall located inward of the thermally-insulative portion, wherein at least one of the first and second parts comprises an interface second portion inwards of the flange, and the thermally-conductive portion provides a thermally-conductive path between the interface second portion and the flange.

14. A coupling for vacuum-insulated piping, the coupling comprising:

first and second parts for forming the coupling;

each of the first and second parts comprising:

an interface portion comprising a substantially flat face, and a flange for connecting the first and second parts, the flat faces of the first and second parts facing each other;

a first inner conduit extending away from the substantially flat face and the flange, the first inner conduit being configured to interface with an inner tube of a vacuum-insulated pipe;

a second outer conduit that is substantially concentric with the first inner conduit, the second outer conduit extending away from the substantially flat face and the flange, the second outer conduit being configured to interface with an outer tube of a vacuum-insulated pipe, wherein the second outer conduit comprises a cylindrical thermally-conducting portion that is in thermal communication with the interface portion so as to conduct heat away from the interface portion, and a cylindrical thermally-insulative portion for inhibiting transfer of heat to the first inner conduit, wherein cylindrical thermally-conducting portion comprises an outer wall exposed to an outside of the coupling, and wherein the cylindrical thermally-conductive portion bounds the cylindrical thermally-insulative portion.

15. An insulated pipe comprising a first and/or a second part of a coupling in accordance with claim 1, comprising an inner pipe for the carriage of a fluid, the inner pipe being in fluid communication with the inner region of the coupling, and a region between the inner pipe and an outer pipe in which there is reduced pressure, the reduced pressure region being in fluid communication with an outer region of the coupling.

16. An insulated piping arrangement comprising first and second vacuum-insulated pipes connected by a coupling in accordance with claim 1.

17. A fuel delivery arrangement comprising one or more fuel tanks configured to deliver fuel to an engine or motor through an insulated piping arrangement according to claim 16.

18. A vehicle comprising a fuel delivery arrangement according to claim 17.

19. A method of supplying a chilled liquid fuel, the method comprising passing said chilled liquid fuel through a coupling in accordance with claim 1.

* * * * *